United States Patent [19]
Hallier et al.

[11] Patent Number: 6,130,915
[45] Date of Patent: Oct. 10, 2000

[54] PROCESS FOR TRANSFERRING DIGITAL DATA VIA INTERFERENCE-AFFECTED RADIO CHANNELS AND DEVICE FOR RECEIVING DIGITAL DATA TRANSMITTED VIA INTERFERENCE-AFFECTED RADIO CHANNELS

[75] Inventors: Juergen Hallier, Luttrum; Henrik Schulze, Meschele; Thomas Lauterbach, Hildesheim, all of Germany

[73] Assignee: Robert Bosch GmbH, Stuttgart, Germany

[21] Appl. No.: 09/029,666

[22] PCT Filed: Jun. 27, 1996

[86] PCT No.: PCT/DE96/01134

§ 371 Date: Mar. 6, 1998

§ 102(e) Date: Mar. 6, 1998

[87] PCT Pub. No.: WO97/09812

PCT Pub. Date: Mar. 13, 1997

[30] Foreign Application Priority Data

Sep. 7, 1995 [DE] Germany .............. 195 32 959

[51] Int. Cl.[7] ....................................... H04L 1/08
[52] U.S. Cl. ............. 375/260; 375/299; 375/340; 375/347; 370/343; 370/345; 370/485; 370/498
[58] Field of Search .................. 375/260, 299, 375/340, 347; 370/343, 345, 480, 485, 498; 455/59, 63

[56] References Cited

U.S. PATENT DOCUMENTS 4,881,241 11/1989 Pommier et al. ............... 375/38
5,784,418 7/1998 Sykes et al. ................... 375/347
5,949,796 9/1999 Kumar ............................ 370/529

OTHER PUBLICATIONS

"A Double Nyquist Digital Product Detector for Quadrature Sampling", by Leopold E. Pellon, IEEE Transactions on Signal Processing, vol. 40, No. 7, Jul. 1992, pp. 1670–1681.

"Principles of Modulating and Channel Coding for Digital Broadcasting for Mobile Receivers", by A. Alard and R. Lassalle EBU Review, Technical No. 224, Aug. 1987, pp. 168–190.

"DAB–Ein Neues Hoerrundkunksystem Stand Der Entwicklung Und Wege Zu Seiner Einfuehrung", by Georg Plenge, Rundfunktechnische Mitteilungen, Heft 2, Jahrgang 35, 1991, pp. 45–46.

*Primary Examiner*—Amanda T. Le
*Attorney, Agent, or Firm*—Michael J. Striker

[57] ABSTRACT

A method for transmitting digitally coded data of a radio program (A) is proposed, in which the digitally coded data are modulated by a modulation method, in particular by OFDM. The data are modulated to at least one carrier wave. The data are transmitted in a transmission frame. The method is characterized in that the data of a radio program (A) are transmitted, with at least one repetition, and then are evaluated in common. In this process the complex values (20, 21), which have been furnished by the demodulator circuit (53), are added together. For a device for receiving digitally coded data of a radio program (A), it is proposed that in it, not only an high-frequency conversion stage (51), an analog/digital converter (52) and a demodulator circuit (53) but also a buffer memory (57) are provided, in which buffer memory at least the data of the time segment of the radio program (A) upon the initial transmission are buffer-stored, and finally an adder stage (58) is provided, in which the data in the buffer memory (57) are added to the corresponding data upon the repeat transmission of the radio program (A).

14 Claims, 3 Drawing Sheets

PROCESS FOR TRANSFERRING DIGITAL DATA VIA INTERFERENCE-AFFECTED RADIO CHANNELS AND DEVICE FOR RECEIVING DIGITAL DATA TRANSMITTED VIA INTERFERENCE-AFFECTED RADIO CHANNELS

BACKGROUND OF THE INVENTION

The invention is based on a method for transmitting digital data and a device for receiving digital data, especially audio and/or video data, including at least one radio program via noise-encumbered radio channels, wherein the data of the at least one radio program are modulated on at least one carrier wave and the data of one time segment of the at least one radio program are transmitted in one transmission frame. A method for transmitting digital data of an radio program via noise-encumbered radio channels is already known from an article by Georg Plenge, "DAB—ein neues Hörrundfunksystem: Stand der Entwicklung und Wege zu seiner Einführung" [DAB—A New Audio Radio System: State of Development and Ways of Introducing It], Rundfunktechnische Mitteilungen, Vol. 35, 1991, No. 2, pp. 45–66. In the transmission method described there, COFDM (coded orthogonal frequency division multiplexing) is employed. In it, a cluster of six radio programs, for instance, is transmitted at an assigned frequency block with a bandwidth of 1.5 MHz. However, whichever time segment of a radio program is transmitted is transmitted only a single time.

A radio system for transmission of information entities which is subject to noise during transmission is described in WO-A-9 506 368, in which the information entities to be transmitted are modulated on the same carrier frequency in the form of two parallel, but temporally shifted, transmitted data flows. During reception of both parallel transmitted data flows by means of a suitable detector, whether or not and if necessary which of both data flows are subjected to interference during their transmission is detected. On the receiver end then the information entities interfered with during the course of the transmission are replaced by the time displaced and thus usually undisturbed information entities in the time displaced transmitted data flow.

SUMMARY OF THE INVENTION

According to the invention, the method of transmitting digital data including at least one radio program via noise-encumbered radio channels comprises modulating data of the at least one radio program in complex form on at least one carrier wave; transmitting data of a time segment of the at least one radio program in a transmission frame; repeating at least once transmission of the data of the time segment of the at least one radio program and adding together complex values obtained in a demodulator of the at least one carrier wave for individual transmissions generated in the transmitting and repeating to obtain reliable decision variables regarding a modulation state of the at least one carrier wave.

The method of the invention has the advantage over the prior art that for certain radio programs, a repeat transmission of the same time segment of the radio program is contemplated. This is followed by a common evaluation of the data transmitted first and the data transmitted in the repetition for one time segment of the radio program. The repeat transmission of the same time segment of a radio program adds redundancy to the data stream. The receiver of the radio program can utilize this redundancy at little additional effort or expense. The method offers advantages particular for mobile reception in a moving car. For instance, if the car is moving at the limits of the broadcast range, there will be increased interference, which can lead to incorrect evaluations of the transmitted data.

Increased interference can be due to multi-path transmission. Repeating the transmission of the same data using a time division multiplexing process now markedly increases the immunity to interference. In all probability, in fact it will no longer be the same data as in the previous transmission that have interference. This fact can be exploited in the receiver, and in the demodulation a sort of mean value of the single transmissions can be formed that then has greater immunity to interference.

Naturally the data transmission capacity of the radio channel is reduced by the repeat transmission of the same data. It may happen that six radio programs can for instance no longer be transmitted in the radio channel but now only three, each of which being transmitted double. However, because of the increased immunity to interference the transmitters can broadcast the various program blocks at lower transmitter power without markedly shrinking the transmission range. This in turn means that shorter intervals can be allowed for re-use of the same frequency block. As a result, the same frequency block can be better used in one country for transmitting a plurality of different radio programs.

The method according to the invention can very advantageously be employed especially in local radio, in which in a relatively large number of small areas, only relatively few programs have to be broadcast. In thinly populated regions, it may not even be necessary to broadcast six programs but perhaps only two or three. In that case, the multiple broadcasting of one or more programs is highly appropriate. The receiver that is able to exploit this (at reasonable additional expense) will assure a considerably greater immunity to interference.

By means of the provisions recited in the dependent claims, advantageous refinements of and improvements to the method defined by the main claim are possible. It is thus advantageous that the repeat transmission of the data of one time segment of the radio program takes place in the same transmission frame as the initial transmission of the data of the same time segment of the radio program. Then the receiver need merely evaluate the data within one transmission frame. This keeps the administrative complication for evaluating the re-transmitted data low.

It is also advantageous that the repeat transmission of the data of a time segment of the radio program is effected within the transmission frame not until after a minimum chronological interval after the initial transmission of the same data. As a result, it is largely assured that even relatively persistent interference cannot jointly affect both transmissions in succession.

In certain cases it may be advantageous if the repeat transmission takes place in a different transmission frame from the first transmission. This applies for instance to the situation where there are quite frequent traffic jams in a region and hence vehicles move very slowly through a so-called radio hole. Because of the greater time lag between transmissions, interference can then often be better eliminated.

The method of the invention can highly advantageously be employed with the modulation method known as OFDM (orthogonal frequency division multiplexing). In it, the data are transmitted having been distributed over a very large number of sub-carriers of a frequency block. Interference then often affects only individual carriers. As a result it is already achieved that incident interference cannot interfere with a large number of successive bits.

In this connection it is highly advantageous if in the transmission of the data with the modulation method OFDM, the corresponding bits of the data in the initial transmission and in the at least one repeat transmission are transmitted over different carrier waves. As a result, it is achieved that not always the same bits will be interfered with if interference for single carriers persists especially long or occurs to an increased extent. Overall, it is highly advantageous if the most well-scrambled possible transmission of the individual bits is performed both in the time range and in the frequency range.

For a device for receiving the digital data of a radio program that are transmitted by the method according to the invention it is advantageous that as additional expense all that has to be provided is one buffer memory as well as one adder stage, in which the data of the initial transmission are added together with the corresponding data of the repeat transmission.

It is also highly advantageous if the addition of the values quantified in many stages (known as soft decision values) takes place before a channel decoding. As a result, it is possible to form the decision variables on the basis of more-reliable input values than in a single transmission.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

The method of the invention can be employed highly advantageously in the new digital radio transmission method known as DAB (digital audio broadcasting). For this new radio transmission method, the essential technical features are described in the specification for the radio transmission process. This specification is entitled: "European Telecommunications Standards Institute (ETSI) and European Broadcasting Union (EBU); Radio broadcast systems; Digital Audio Broadcasting (DAB) to mobile, portable and fixed receivers, Draft ETS 300 401, Geneva and Sophia Antipolis, February 1995."

Figure 1:
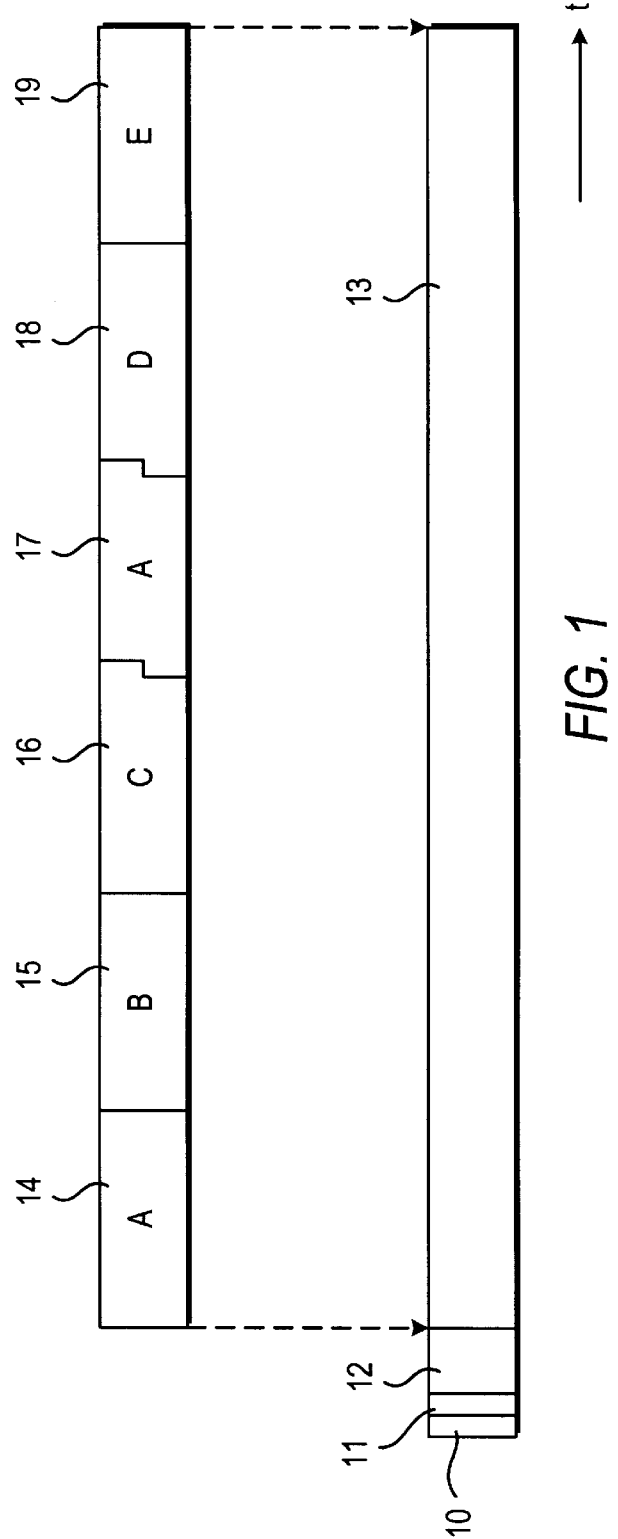
FIG. 1 is a diagram of a transmission frame for transmitting data of radio programs.

The lower part of FIG. 1 shows the transmission frame, which is also used in the radio transmission process known as DAB. Reference numeral 10 indicates the zero symbol. Reference numeral 11 indicates the phase reference symbol TFPR (for time-frequency-phase reference). The zero symbol marks the beginning of the frame and is used for rough synchronization. From the zero symbol, the receiver can ascertain the noise characteristic of the channel and thus receives information on the occurrence of interference. The TFPR symbol is used for frequency regulation, fine symbol synchronization, and as an initial phase for the DQPSK (differential quadrature phase shift keying) modulation. Next, three symbols are transmitted in field 12. These are Fast Information Channel (FIC) symbols. These symbols contain pieces of information about where in the next data field 13 the data assigned to certain programs and services can be found, and what the channel coding in each case looks like. 72 further signals are transmitted in the next data field 13. These then contain the audio data of various radio programs and optionally other additional data.

In the radio transmission process known as DAB, the multicarrier method known as OFDM (orthogonal frequency division multiplexing) is employed. This method is known from the prior art and in this respect reference is made both to the aforementioned DAB specification and to the article by M. Alard and R. Lassalle, "Principles of modulation and channel coding for digital broadcasting for mobile receivers", EBU Review, Technical No. 224, August 1987, pp. 168–190. The aforementioned symbols therefore pertain to OFDM symbols. In the aforementioned specification, for instance, the transmission mode TMII is defined as the transmission of 76 OFDM symbols per frame (without any zero symbol). Each symbol occupies 384 sub-carriers in the corresponding radio channel. Such a radio channel has a bandwidth of 1.5 MHz. The entire transmission frame of FIG. 1, including the zero symbol, is transmitted within a period of 24 ms. Since in DAB the modulation method known as $\pi/4$-shift DQPSK is employed, one piece of information, each of two bits, is transmitted per sub-carrier and per OFDM symbol. When there are 384 sub-carriers, a transmission capacity of 768 bits per OFDM symbol is thus the result. In data field 13, which is also known as the useful channel MSC (main service channel), a total of 55,296 bits are accordingly transported. The entire transmission frame of FIG. 1 is also known as a CIF (common interleaved frame). The aforementioned transmission capacity in data field 13 is freely available to the user in accordance with the aforementioned specification.

It has often been proposed that this transmission capacity be utilized to simultaneously broadcast six radio programs. Naturally, the usage of this data field 13 depends on the individual case. For instance, if a few programs with a very large audio data rate are to be transmitted, then possibly only fewer than six audio programs can be transported in the transmission frame. On the other hand, even more than six radio programs can be transported in the transmission frame if they have a lesser audio data rate.

According to the invention, the following is now proposed: the transmission capacity in the transmission frame is not entirely used for different radio programs but instead the data of a radio program are inserted in doubled or higher-multiple form into the transmission frame. This becomes clear from the upper portion of FIG. 1. Reference numerals 14–19 designate so-called sub-channels. In sub-channel 14, for instance, all the audio data of a radio program A are transmitted. Naturally, these audio data pertain to only a brief time segment of the radio program. The next time segment of the radio program does not follow then until the next transmission frame. In the sub-channel 15, the audio data of a radio program B are correspondingly transmitted. In sub-channel 16, the data of a further radio program C are transmitted. In sub-channel 17, the same data of radio program A as in sub-channel 14 are then transmitted again. Finally, in sub-channel 18, the data of the radio program D are transmitted, while in sub-channel 10, the audio data of a further radio program E are transmitted.

By the multiple transmission of radio program A, the following is now achieved: The receiver receives a real signal of very high frequency. This signal is mixed in the receiver, in a high-frequency stage, into a complex base band. The methods needed for this are known. For instance, the real band-pass signal can be modulated in two channels with carriers that are in phase quadrature to one another, and it can then be low-pass filtered. This is an analog signal processing, for instance. Next, by analog/digital conversion, a digital data stream is generated for the in-phase and the quadrature components of the complex base band signal. Methods are also known in which with the aid of digital signal processing the real band-pass signal is mixed into the complex base band, and the data streams for the in-phase and quadrature components are generated in that way. In this respective, reference is made by the article by L. E. Pellon: "A Double Nyquist Digital Product Detector for Quadrature Sampling", IEEE Transactions and Signal Processing, Vol. 40, No. 7, July 1992, pp. 1670–1681.

The scanned values for the complex base band signal are each collected for the duration of one OFDM symbol and delivered to an OFDM demodulator. There, a discrete Fourier transform is accomplished by the known method, with the aid of the known FFT (Fast Fourier Transform) algorithm. This produces complex symbols $Z_{l,k}$ for the individual sub-carriers, whose phase positions contain the information. The subscript l means that the complex numbers are valid for the $l^{th}$ OFDM symbol. The subscript k indicates that the complex number is for the $k^{th}$ sub-carrier. Upon differential modulation, such as DQPSK, the following product formation takes place in the demodulator: $u_{l,k} = Z_{l,k} * Z^*_{l-1,k}$.

In this equation, $u_{l,k}$ stands for the complex representation of the respective symbol after the Fourier transform and DQPSK demodulation. $Z^*_{l-1,k}$ stands for the conjugated complex number for the $k^{th}$ sub-carrier of the previously transmitted $l-1^{th}$ OFDM symbol.

In the conventional transmission method, the received signals $u_{l,k}$ are all evaluated separately. This is done by examining the real and imaginary portions of the complex symbol $u_{l,k}$. In this evaluation, decision variables are formed in accordance with the magnitude and algebraic sign of the real and imaginary portions of $u_{l,k}$. This is done in a channel decoder, which for instance by a Viterbi algorithm recovers the modulated data.

According to the invention, for the symbols of radio program A that are transmitted double, a joint evaluation is done. To that end, the complex representations of the symbols $u_{l,k}$ corresponding to one another in the two transmissions are added to one another. The following formula applies:

$$u_{l,k} = uhd\ l,k^{(1)} + u_{l,k}^{(2)}.$$

Here $u_{l,k}^{(1)}$ is the complex representation of the $l^{th}$ symbol for the $k^{th}$ sub-carrier upon the initial transmission. $U_{l,k}^{(2)}$ is the complex representation of the $l^{th}$ symbol for the $k^{th}$ sub-carrier after the repeat transmission. Only after that are the decision variables formed in the channel decoder. Adding together the complex numbers for the symbols $u_{l,k}^{(1)}$ and $u_{l,k}^{(2)}$ increases the immunity to noise or interference in the evaluation of the transmitted data considerably. This improvement is illustrated for instance in FIG. 2.

Figure 2:
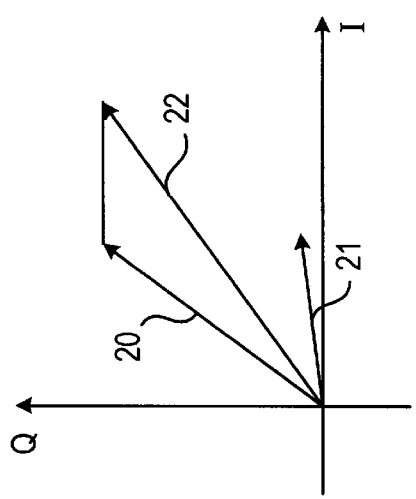
FIG. 2 is a graphical illustration of addition of complex numbers.

In FIG. 2, reference numeral 20 designates the complex number $u_{l,k}^{(1)}$ for the $k^{th}$ sub-carrier of the $l^{th}$ symbol after the initial transmission. Reference numeral 21 designates the complex number $u_{l,k}^{(2)}$ for the $k^{th}$ subcarrier of the $l^{th}$ symbol after the second transmission. The complex numbers are represented by arrows in the complex number plane. The real portion of each complex number is designated by the I component (in-phase component). The imaginary portion of the respective complex number is designated by the Q component (quadrature component). By adding together the two complex numbers 20 and 21, the complex number 22 is obtained. It is known that adding together complex numbers is equivalent to a vector addition, and so the arrow 22 represents the result of this addition. In the DQPSK modulation employed in the DAB radio transmission method, only the values 0,π/4, 90 /2, 3/4π, π, 5/4π, 3/2π, and 7/4π, occur as phase angles for the individual sub-carriers. As can be seen from the complex number 21, the $k^{th}$ sub-carrier is greatly attenuated in the repeat transmission, which is clearly shown by the lesser amount of this number. It can be seen from the complex number 20 that the $k^{th}$ sub-carrier in the initial transmission was received substantially more strongly. However, it is relatively difficult to make the association with one of the possible phase angles. After the addition of the two complex numbers, a strong carrier is obtained, whose phase angle is very close to π/4. Thus the decision in favor of a received phase angle is markedly easier to carry out, with greater reliability, for the resultant complex number 22 than for the complex numbers 20 and 21 after the individual transmissions. Naturally still other criteria play a role in the decision as to which phase angle is in fact involved, such as whether the phase angle, compared with the previous transmission of a phase state on this sub-carrier, is permitted or not. This is true particularly for the type of modulation DQPSK that is used.

Accordingly, by re-transmission of the OFDM symbols, in conjunction with the described evaluation method, an increase in noise immunity is attained in the formation of the decision variables for the phase states of the individual carriers. Reliability information, which are obtained by analysis of the complex numbers for the individual carriers and the individual transmissions, can be automatically taken into account. Specifically, when the complex numbers are added together, the amounts of the respective complex numbers and the phase angles are suitably taken into account.

Since interference on the transmission channel fluctuates very widely over time and is also frequency-selective, it is appropriate, in order to further increase the immunity from interference, not to perform the repeat transmission of the same data directly afterward but rather, between the initial transmission of the data and the repeat transmission of the data, first to transmit the data from one or more other radio programs within the time for the transmission of one transmission frame. This is indicated in FIG. 1 by the transmission of the data of radio programs B, C between the transmissions of the data of radio program A.

Figure 3:
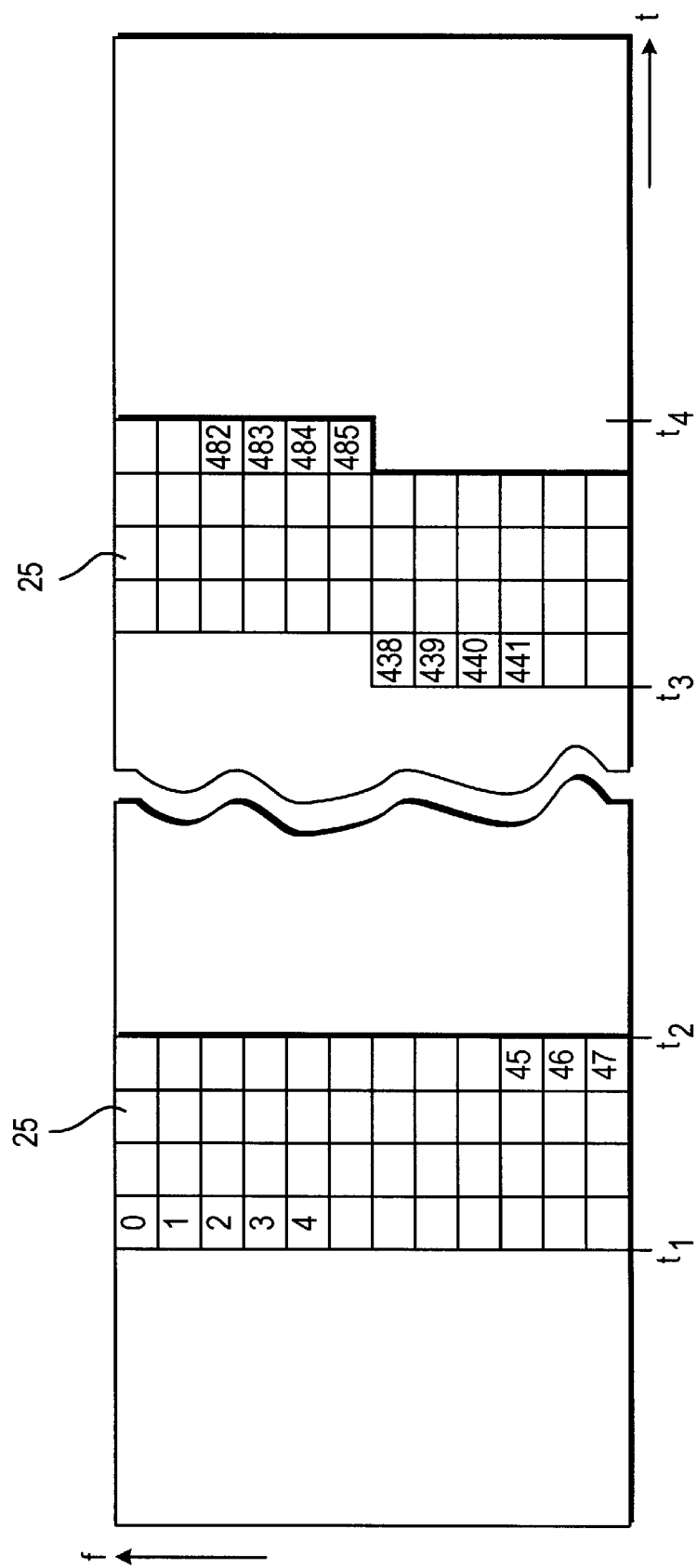
FIG. 3 is a diagram of one example of a repeat transmission of the same data for one time segment of a radio program.

It is also appropriate not to transmit the same bits in the initial transmission and the repeat transmission over the same sub-carriers, but instead to perform the maximum possible scrambling in this respect. This is shown in further detail in FIG. 3 for one example. This example applied to the TMII transmission mode, by the DAB radio transmission method. The bits are transmitted over 384 sub-carriers. Reference numeral 25 designates so-called capacity units of the transmission frame. At time $t_1$, the initial transmission of the data for radio program A is begun. The capacity units are numbered sequentially from 0 to 47. In each capacity unit, 64 bits each are transmitted. Since two bits are transmitted over each sub-carrier, the 12 capacity units shown occupy all 384 sub-carriers. At time $t_2$, all the data of radio program A have been transmitted for the first time. At time $t_3$, the repeat transmission of the data of radio program A is begun. Between times $t_2$ and $t_3$, the data of other radio programs are transmitted. However, upon the re-transmission of the data of radio program A, the first data are first transmitted in the capacity unit 438. As FIG. 3 clearly shows, the result thus obtained is that the same data are not transmitted over the same sub-carrier. Thus noise in individual sub-carriers that may occur and persist for a long time is quasi-eliminated, since upon the repeat transmission, the data transmitted via the noise-encumbered carrier are transmitted over a different sub-carrier, which is highly likely not to have any interference. Simulation calculations have shown that by the provisions described, the requisite signal-to-noise ratio for unimpaired reception can be lowered by up to 13 dB compared with the conventional transmission method. Naturally, the repeat broadcast reduces the transmission capacity. However, in some areas it is hardly likely that there will be a large number of local radio operators, and especially in such cases the aforementioned provisions can thus be employed highly advantageously.

Figure 4:
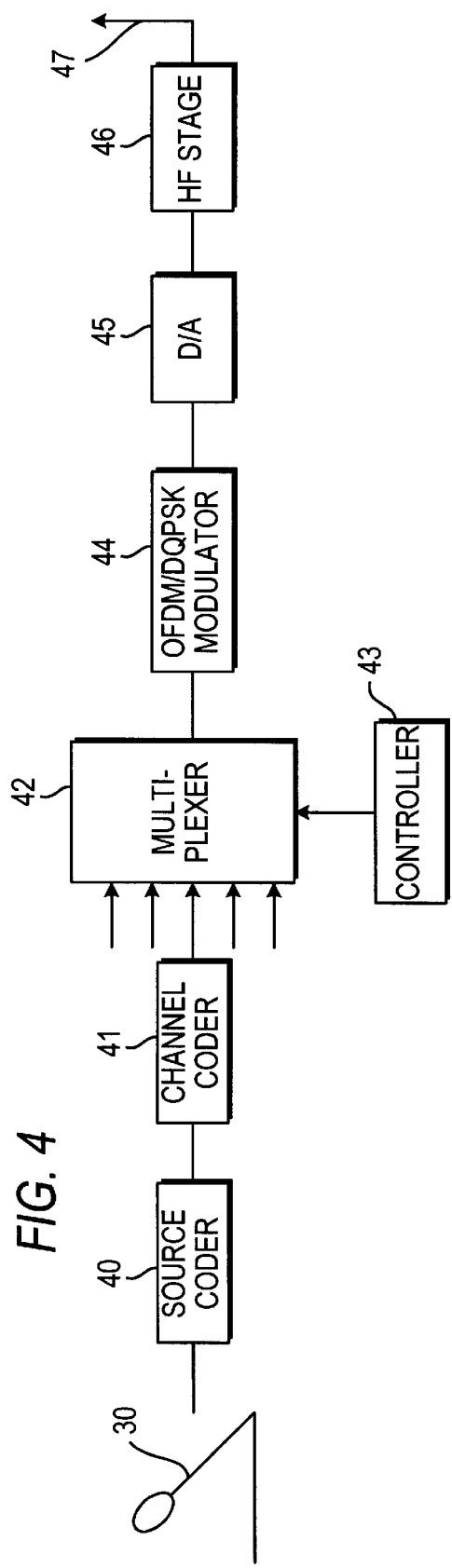
FIG. 4 is a rough block diagram of a radio transmitter for transmitting the data of the radio programs.

FIG. 4 now schematically shows the components needed on the transmitter side in order to achieve the described method. Reference numeral 30 indicates a sound studio in which a radio program to be broadcast is recorded. The audio data recorded are subjected to audio data reduction in a source coder 40. The reduced data are then delivered to a channel coder 41. The coded data are then delivered to a multiplexer 42. Naturally still other radio program data are also supplied to the multiplexer. The other data are generated in the same way. A control unit 43 takes over the control of the multiplexer 42. The control unit 43 is also known as an FIC (fast information channel) generator. The data present at the output of the multiplexer 42 are delivered to an OFDM/DQPSK modulator 44. The resultant signals are converted in a digital/analog converter and in an ensuing high-frequency stage 46 are converted into the corresponding HF signal and amplified. The resultant signal is broadcast via a transmission antenna 47. The control unit 43 decides which program will be broadcast at what time, and for that purpose then at the correct time sends the appropriate data to the OFDM modulator 44 once again. Also in the control unit 43, the requisite pieces of control information, which are transmitted at the beginning of each transmission frame in field 12 (the FIC field), are generated. This is also where the corresponding piece of information is inserted that indicates which radio program is broadcast in a repetition, when the repeat broadcast is, which capacity units it occupies in the initial broadcast, and which capacity units are occupied in the repeat broadcast.

Figure 5:
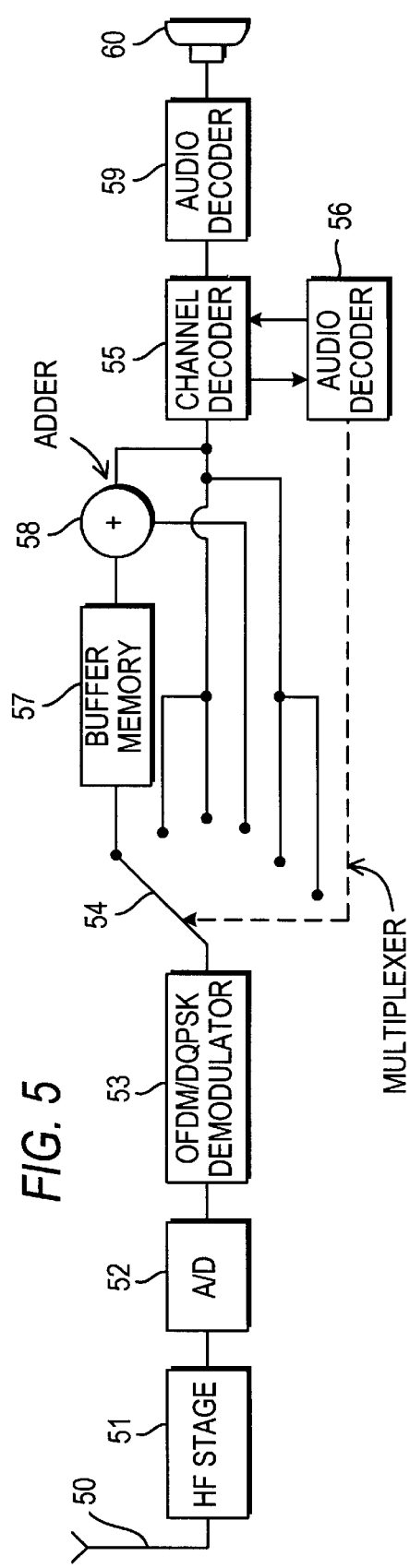
FIG. 5 is a rough block diagram of a radio receiver for receiving the data of the radio programs.

FIG. 5 now shows the provisions required in a suitably designed radio receiver in order to realize the transmission method of the invention. Reference numeral 50 indicates the receiving antenna. Reference numeral 51 indicates a high-frequency stage, in which the conversion of the received signal into a complex base band signal is done. Reference numeral 52 designates an analog/digital converter. In it, the in-phase and quadrature components of the complex base band signals are sampled. In the following OFDM/DQPSK demodulator 53, the sampled values are subjected to a Fourier transform. Via a multiplexer 54, the complex numbers obtained are delivered to a channel decoder 55. The channel decoder 55 is controlled by an evaluation stage 56. In this evaluation stage 56, the pieces of FIC information transmitted in field 12 are evaluated. Since in field 12 the information is also transmitted as to whether a radio program is being broadcast multiple times within the transmission frame, and which tells for each transmitted radio program which capacity units it occupies, the multiplexer 54 is also controlled by the evaluation stage 56. As can be seen from the switchover direction of the multiplexer 54, first the data of radio program A are delivered to a buffer memory 57. In it, all the data of the radio program A are stored. Next, the data of radio programs B and C are carried onward to the channel decoder 55. After that, as shown in FIG. 1, the data of the second broadcast of the radio program A are again present. The multiplexer 54 is accordingly switched into its fourth position. These data then pass to a summation point 58. In it, the data present are added to the corresponding data in the buffer memory 57. The summation values are then delivered to the channel decoder 55. On the basis of the set information as to which of the five possible programs is to be reproduced, only the suitably decoded data are carried on, under the control of the evaluation stage 56, to the audio decoder 59, which converts the data back into analog signals and delivers them to the speaker 60.

The described method and the described arrangements can advantageously be used particularly in the digital radio broadcast method known as DAB. But applications in the field of digital television or mobile radio are equally conceivable. Naturally, the multiple repetition of audio data of individual radio programs in one transmission frame is also within the scope of the invention. The repeat transmission of two or more different radio programs in the same or different transmission frames is also considered to be within the scope of the invention. The invention has been described in conjunction with the differential modulation type known as DQPSK, which is usual for DAB. However, some other type of modulation can also be used, such as QPSK (quadrature phase shift keying) or QAM (quadrature amplitude modulation). In these cases, the decision variables should be formed in accordance with the then-applicable regulations. However, the addition of the complex values after the Fourier transform also takes place, as described.

What is claimed is:

1. A method of transmitting digital data comprising at least one radio program via noise-encumbered radio channels, said method comprising the steps of:
   a) modulating the digital data of the at least one radio program in complex form on at least one carrier wave;
   b) transmitting data of a time segment of the at least one radio program in a transmission frame;
   c) repeating at least once transmission of said data of said time segment of the at least one radio program; and
   d) adding together complex values obtained in a demodulator (53) of the at least one carrier wave for individual transmissions generated in steps b) and c) to obtain reliable decision variables regarding a modulation state of the at least one carrier wave.

2. The method as defined in claim 1, wherein the at least one radio program consists of a plurality of different radio programs and the data of the time segment for the plurality of different radio programs (A, B, C, D, E) are transmitted in the transmission frame.

3. The method as defined in claim 2, wherein at least one repeat transmission of the data of the time segment of one radio program (A) of said plurality takes place in the same transmission frame in which an initial transmission of the same data of the time segment of the one radio program (A) also took place.

4. The method as defined in claim 3, wherein the at least one repeat transmission of the data of the time segment of said one radio program (A) does not occur within the transmission frame until after a minimum time interval after the initial transmission of the same data of the time segment.

5. The method as defined in claim 3, wherein the at least one repeat transmission of the data of the time segment of the one radio program (A) takes place in a different, later transmission frame from the initial transmission thereof.

6. The method as defined in claim 1, wherein the transmission frame includes a head field (11), a control field (12) and a data field (13).

7. The method as defined in claims 6, further comprising writing information entities regarding which of the at least one radio program is again transmitted, and from which bit an initial transmission and a repeat transmission of data of the at least one radio program begins, into the control field (12) of the transmission frame on a transmitter side.

8. The method as defined in claim 1, wherein during the modulating of the digital data the modulating is performed using a multicarrier orthogonal frequency division multiplexing modulation method and during said transmitting and said repeating corresponding bits of the data in the transmitting and the repeating are transmitted over different carrier waves.

9. The method as defined in claim 1, further comprising channel coding the data of the time segment of one radio program (A) of the at least one radio program on a transmitter side and channel decoding said data on a receiver side, and wherein the adding together of the complex numbers (20, 21) for the at least one carrier wave takes place before the channel decoding.

10. The method as defined in claim 1, wherein said digital data comprises audio and/or video data.

11. A device for receiving digitally coded data of a radio program, wherein said digitally coded data are transmitted by the method comprising the steps of modulating the digitally coded data of the at least one radio program on at least one carrier wave; transmitting data of a time segment of the at least one radio program in a transmission frame and repeating at least once transmission of said data of said time segment of the at least one radio program;

said device comprising a high-frequency conversion stage producing a signal, an analog/digital converter for scanning the signal from the high-frequency conversion stage, a demodulator circuit including means for obtaining complex numbers for the data of the time segment of one (A) of the at least one radio program initially transmitted in the transmitting, a buffer memory (57) in which at least the complex numbers obtained in the demodulator circuit (53) are buffer-stored and an adder stage (58) including means for adding the complex numbers in the buffer memory (57) to corresponding complex numbers from at least one repetition of said data of said one (A) of the at least one radio program to obtain added-together complex numbers (20,21).

12. The device as defined in claim 11, further comprising a channel decoder (55) to which the added-together complex numbers (20, 21) are supplied, said channel decoder including means for obtaining decision variables for a modulation state of the at least one carrier wave.

13. The device as defined in claim 11, wherein the demodulator circuit is an orthogonal frequency division multiplexing demodulator.

14. The device as defined in claims 11, further comprising a multiplexer (54) connected to the demodulator circuit, a channel decoder (55) connected to the multiplexer and an evaluation stage (56) connected to the channel decoder, said evaluation stage including means for evaluating information entities in a control field (12) of said transmission frame and means for triggering said multiplexer based on said information entities in the control field (12) so as to supply said complex numbers (20, 21) from the demodulator circuit (53) to either the buffer memory (57), the channel decoder (55) or the adder stage (58).

* * * * *